(No Model.)

W. D. LEE.
PIPE COUPLING.

No. 343,246. Patented June 8, 1886.

Witnesses:
M. E. Harrison
James A. Williams

Inventor.
William D Lee
Per O. D. Lewis
att'y.

UNITED STATES PATENT OFFICE.

WILLIAM D. LEE, OF PITTSBURG, PENNSYLVANIA, ASSIGNOR TO THOMAS E. UNKS, OF SAME PLACE.

PIPE-COUPLING.

SPECIFICATION forming part of Letters Patent No. 343,246, dated June 8, 1886.

Application filed February 5, 1886. Serial No. 190,956. (No model.)

*To all whom it may concern:*

Be it known that I, WILLIAM D. LEE, a citizen of the United States, residing at Pittsburg, in the county of Allegheny and State of Pennsylvania, have invented certain new and useful Improvements in Pipe-Couplings; and I do hereby declare the following to be a full, clear, and exact description of the invention, such as will enable others skilled in the art to which it pertains to make and use the same, reference being had to the accompanying drawings, which form a part of this specification.

My invention relates to an improvement in pipe-couplings, the object being to provide a pipe coupling or connection that will resist any degree of pressure; and with this end in view my invention consists in certain details of construction and combination of parts, as will be more fully set forth hereinafter.

Figure 1:
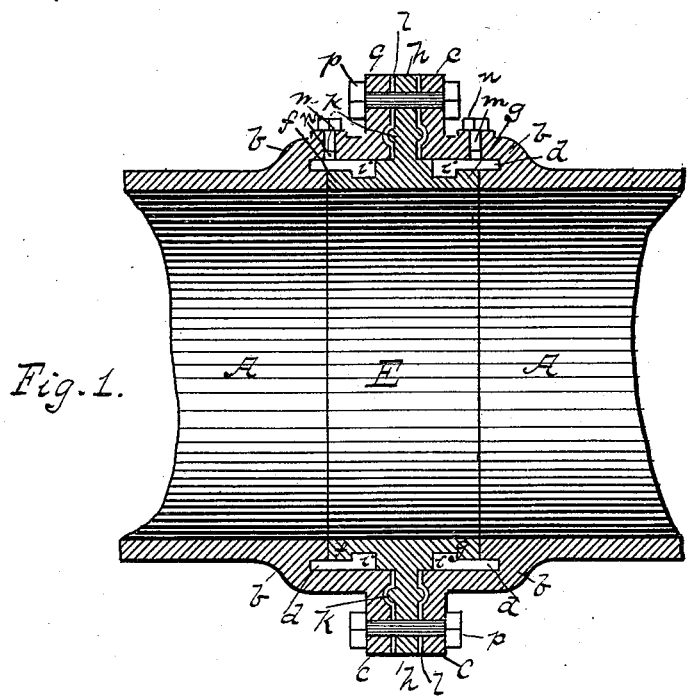
Figure 2:
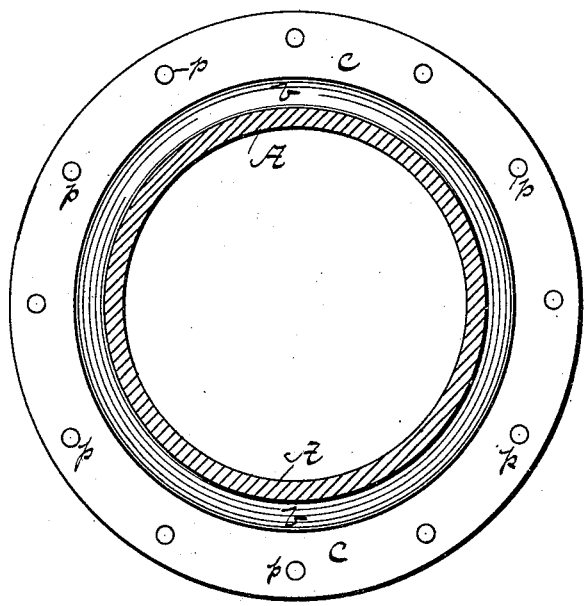

In the accompanying drawings, Figure 1 is a sectional elevation of my improved coupling constructed in accordance with my invention. Fig. 2 is an end elevation of the same.

To put my invention into practice I construct a pipe, A, having at each end an enlargement or bowl, $b$, provided with an outwardly-projecting flange, $c$, and a recess, $d$, formed at the back of the bowl $b$. I next construct a central piece, E, provided with three flanges, $f g h$, and place the same between the flanges $c$ on the ends of the pipes A. Two of these flanges, $f g$, are placed in the bowls $b$ of the pipes A, and the remaining one between the flanges $c$ on the bowls $b$ of the pipes A. The two horizontal flanges $f g$ have a double recess or groove, $i$, formed on the outside. The remaining portion of the flanges $f g$ is of the same diameter as that of the inside of the bowls $b$. A small bead, $k$, is formed on each side of the vertical flange $h$, which serves to confine a gasket, $l$, between the flanges of the pipes A and that of the vertical flange $h$. The openings $m$ at the top of the bowls $b$, directly over the inside space, $i$, affords a means whereby lead or other material may be poured in and the inner space, $i$, filled. This opening $m$ is fitted with a small screw-bolt, $n$, which is used to close the said opening $m$. Strong bolts $p$, passed through the three vertical flanges, secure the connection or coupling. The lead filling $i$ and packing $l$ between the vertical flanges prevent any escape of gas or other substance confined in the pipes A.

Having thus described my invention, what I claim, and desire to secure by Letters Patent, is—

1. In a pipe coupling or connection for conveying any substance under pressure, a central piece, E, consisting of three flanges, $f g h$, provided with a recess, $i$, and projecting beads $k$, substantially as and for the purpose set forth.

2. In a pipe coupling or connection for conveying any substance under pressure, the combination of the pipes A, provided with an enlargement or bowl at either end, and outwardly-projecting flanges $c$, and recess $d$, formed at the back of the bowls, a central piece, E, consisting of three flanges, $f g h$, two of which are provided with recesses $i$ and act in conjunction with that formed at the back of the bowls, a projecting bead, $k$, formed on either side of the vertical flange $h$, the opening $m$, communicating with the space $i$, formed by the recesses, and a suitable means for closing the same, the packing $l$ between the vertical flanges $c h$, and a suitable number of bolts, $p$, for securing the parts together, substantially as shown and described.

WILLIAM D. LEE.

Witnesses:
JAMES McGOWAN,
JAMES A. WILLIAMS.